US012705368B2

(12) United States Patent
Gadde et al.

(10) Patent No.: US 12,705,368 B2
(45) **Date of Patent: *Aug. 11, 2026**

(54) VARIANT INCONSISTENCY ATTACK (VIA) AS A SIMPLE AND EFFECTIVE ADVERSARIAL ATTACK METHOD

(71) Applicant: Oracle International Corporation, Redwood Shores, CA (US)

(72) Inventors: Srinivasa Phani Kumar Gadde, Fremont, CA (US); Xu Zhao, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 184 days.

This patent is subject to a terminal disclaimer.

(21) Appl. No.: 18/800,990

(22) Filed: Aug. 12, 2024

(65) Prior Publication Data

US 2024/0403447 A1 Dec. 5, 2024

Related U.S. Application Data

(63) Continuation of application No. 17/707,392, filed on Mar. 29, 2022, now Pat. No. 12,086,274.

(Continued)

(51) Int. Cl.

*G06F 21/60* (2013.01)
*G06F 40/295* (2020.01)
*H04L 51/02* (2022.01)

(52) U.S. Cl.

CPC ............ *G06F 21/60* (2013.01); *G06F 40/295* (2020.01); *H04L 51/02* (2013.01)

(58) Field of Classification Search

CPC ......... G06F 21/60; G06F 40/295; H04L 51/02
See application file for complete search history.

(56) References Cited

U.S. PATENT DOCUMENTS

| | | | |
|---|---|---|---|
| 11,036,857 | B2 | 6/2021 | Tran et al. |
| 11,227,215 | B2 | 1/2022 | Liu et al. |

(Continued)

FOREIGN PATENT DOCUMENTS

| | | | |
|---|---|---|---|
| JP | 2021022317 | A | 2/2021 |
| WO | 2019207770 | A1 | 10/2019 |
| WO | 2020165935 | A1 | 8/2020 |

OTHER PUBLICATIONS

MCTSBug: Generating Adversarial Text Sequences via Monte Carlo Tree Search and Homoglyph Attack; Ji Gao, Jack Lanchantin, Yanjun Qi; Sep. 27, 2018; ICLR 2019 Conference; pp. 1-20.*

(Continued)

*Primary Examiner* — Mohammad A Siddiqi
(74) *Attorney, Agent, or Firm* — Kilpatrick Townsend & Stockton LLP

(57) ABSTRACT

The present disclosure relates to techniques for using variant inconsistency attack (VIA) as a simple and effective adversarial attack method to create useful adversarial examples for adversarial training of machine-learning models. In one particular aspect, a method is provided that includes obtaining a set of input examples for attacking a machine-learning model (the set of examples do not have corresponding labels), modifying an example from the set of examples in a utility preserving manner to generate a pair of modified examples, attacking the machine-learning model with the pair of modified examples in order generate a pair of predictions for the pair of modified examples, comparing the pair of predictions to determine whether the pair of predictions are the same or different, and in response to the pair of predictions being different, adding the pair of modified examples to a set of adversarial examples.

18 Claims, 9 Drawing Sheets

Related U.S. Application Data

(60) Provisional application No. 63/185,531, filed on May 7, 2021.

(56) References Cited

U.S. PATENT DOCUMENTS

| | | | | |
|---|---|---|---|---|
| 11,256,754 | B2 * | 2/2022 | Tan | G06F 16/3329 |
| 11,544,472 | B2 * | 1/2023 | Stabler | G06F 40/216 |
| 11,856,276 | B2 | 12/2023 | Banerjee | |
| 12,086,274 | B2 | 9/2024 | Gadde et al. | |
| 12,524,630 | B2 * | 1/2026 | Clinchant | G06F 40/58 |
| 2016/0055240 | A1 * | 2/2016 | Tur | G06F 16/685 707/706 |
| 2019/0005386 | A1 | 1/2019 | Chen et al. | |
| 2019/0260775 | A1 | 8/2019 | Bartos et al. | |
| 2020/0125943 | A1 | 4/2020 | Copty et al. | |
| 2020/0167471 | A1 | 5/2020 | Rouhani et al. | |
| 2021/0012188 | A1 | 1/2021 | Zhang et al. | |
| 2021/0226990 | A1 | 7/2021 | Devi et al. | |
| 2021/0319093 | A1 | 10/2021 | Molloy et al. | |
| 2022/0094709 | A1 * | 3/2022 | Sharma | G06F 18/2415 |
| 2022/0114399 | A1 | 4/2022 | Castiglione et al. | |
| 2022/0126864 | A1 | 4/2022 | Moustafa et al. | |

OTHER PUBLICATIONS

TFlip: White-Box Adversarial Examples for Text Classification; Javid Ebrahimi, Anyi Rao, Daniel Lowd, Dejing Dou; Proceedings of the 56th Annual Meeting of the Association for Computational Linguistics (vol. 2: Short Papers); Jul. 2018—aclanthology.org; pp. 31-36.*

U.S. Appl. No. 17/707,392 , "Non-Final Office Action", filed Feb. 1, 2024, 12 pages.

U.S. Appl. No. 17/707,392 , "Notice of Allowance", filed May 10, 2024, 10 pages.

Biggio , et al., "Evasion Attacks Against Machine Learning at Test Time", Machine Learning and Knowledge Discovery in Databases, Aug. 21, 2017, 16 pages.

Gao , et al., "Black-box Generation of Adversarial Text Sequences to Evade Deep Learning Classifiers", Cornell University Library, Available Online at: https://arxiv.org/pdf/1801.04354.pdf, Jan. 13, 2018, 21 pages.

Gao , et al., "Black-Box Generation of Adversarial Text Sequences to Evade Deep Learning Classifiers", Institute of Electrical and Electronics Engineers Security and Privacy Workshops, May 23, 2018, pp. 1-21.

Goodfellow, et al., "Explaining and Harnessing Adversarial Examples", International Conference on Learning Representations, Mar. 20, 2015, pp. 1-11.

Jia, et al., "Adversarial Examples for Evaluating Reading Comprehension Systems", Empirical Methods in Natural Language Processing, Jul. 23, 2017, 11 pages.

Jin , et al., "TextFool: Fool Your Model with Natural Adversarial Text", Available Online at: http://groups.csail.mit.edu/medg/ftp/psz-papers/2019%20Di%20Jin.pdf, 2019, 10 pages.

Lecun , et al., "Gradient-Based Learning Applied to Document Recognition", Proceedings of the Institute of Electrical and Electronics Engineers, vol. 86, No. 11, Nov. 1998, pp. 2278-2324.

Liang , et al., "Deep Text Classification can be Fooled", Proceedings of the Twenty-Seventh International Joint Conference on Artificial Intelligence, Apr. 26, 2017, pp. 4208-4215.

Morris , et al., "Reevaluating Adversarial Examples in Natural Language", Cornell University Library, Available Online at: https://arxiv.org/pdf/2004.14174.pdf, Apr. 25, 2020, 15 pages.

Mrksic , et al., "Counter-Fitting Word Vectors to Linguistic Constraints", Proceedings of the 2016 Conference of the North American Chapter of the Association for Computational Linguistics: Human Language Technologies, Mar. 2, 2016, 7 pages.

International Application No. PCT/US2022/022291 , "International Preliminary Report on Patentability", Nov. 16, 2023, 7 pages.

International Application No. PCT/US2022/022291 , "International Search Report and Written Opinion", Aug. 4, 2022, 10 pages.

Peng , et al., "Structure-Preserving Transformation: Generating Diverse and Transferable Adversarial Examples", Cornell University Library, Available Online at: https://arxiv.org/pdf/1809.02786.pdf, Sep. 8, 2018, 8 pages.

Ribeiro , et al., ""Why Should I Trust You?" Explaining the Predictions of Any Classifier", Proceedings of the 22nd ACM SIGKDD International Conference on Knowledge Discovery and Data Mining, Aug. 2016, pp. 1135-1144.

Ribeiro , et al., "Anchors: High-Precision Model-Agnostic Explanations", Association for the Advancement of Artificial Intelligence, vol. 32, No. 1, Apr. 25, 2018, pp. 1527-1535.

Szegedy , et al., "Going Deeper with Convolutions", Institute of Electrical and Electronics Engineers Conference on Computer Vision and Pattern Recognition, Sep. 17, 2014, pp. 1-12.

Szegedy , et al., "Intriguing Properties of Neural Networks", International Conference on Learning Representations, Feb. 19, 2014, pp. 1-10.

Zhang , et al., "Adversarial Attacks on Deep Learning Models in Natural Language Processing: A Survey", Association for Computing Machinery Transactions on Intelligent Systems and Technology, vol. 1, No. 1, Apr. 11, 2019, pp. 1-40.

Zhao , et al., "Variant Inconsistency Attack (VIA): A Simple and Effective Adversarial Attack Method Without Using Labeled Data", Oracle, 15 pages.

Japanese Application No. 2023-568351, Notice of Decision to Grant mailed Oct. 28, 2025, 3 pages.

* cited by examiner

Pair1:

| | Candidate 1 | Candidate 2 |
|---|---|---|
| Image | | |
| **Model Prediction** | Digit 6 | Digit 0 |
| **Expected Prediction** | Digit 0 | Digit 0 |

Pair2:

| | Candidate 1 | Candidate 2 |
|---|---|---|
| Image | | |
| **Model Prediction** | Digit 7 | Digit 2 |
| **Expected Prediction** | Digit 3 | Digit 3 |

VARIANT INCONSISTENCY ATTACK (VIA) AS A SIMPLE AND EFFECTIVE ADVERSARIAL ATTACK METHOD

CROSS-REFERENCES TO RELATED APPLICATIONS

This application is a continuation of U.S. patent application Ser. No. 17/707,392, filed Mar. 29, 2022, which claims priority to U.S. Provisional Application No. 63/185,531, filed on May 7, 2021, which are incorporated herein by reference in their entirety for all purposes.

FIELD

The present disclosure relates to adversarial attacks, and in particular to techniques for using variant inconsistency attack (VIA) as a simple and effective adversarial attack method to create useful adversarial examples for adversarial training of machine-learning models.

BACKGROUND

With the rapid development of machine-learning technology in the past two decades, machine-learning has seen proliferation into real world problems such as face recognition, fake news detection and gene series analysis to name a few. However, it is proved time and again that all machine-learning models are imperfect. In fact, they are very vulnerable to adversarial examples, which are carefully crafted to make a trained model fail. Adversarial examples that can fool the models may make a substantially adverse impact to applications that deal with sensitive information such as health analysis, financial analysis, personal shopping behavior analysis, etc. For example, an adversarial example crafted to make a model that redacts personal information can be made to leak sensitive information or cause fatal damage in applications like autonomous driving.

Defending against such adversarial attacks ahead of pushing a model into production is thus a critical and challenging topic of machine-learning research. Previous research has found adversarial training, that is mixing the adversarial examples with original training dataset, is an effective way to defend a model against adversarial attacks. Naturally, how to automatically generate adversarial examples for adversarial training is a key issue in defending against such attacks.

SUMMARY

The present disclosure relates generally to adversarial attacks. More particularly, techniques described herein relate to using VIA as a simple and effective adversarial attack method to create useful adversarial examples for adversarial training of machine-learning models. Various inventive embodiments are described herein, including methods, systems, non-transitory computer-readable storage media storing programs, code, or instructions executable by one or more processors, and the like.

In various embodiments, a computer-implemented method is provided comprising: obtaining a set of input examples for attacking a machine-learning model, where the set of examples do not have corresponding labels; modifying an example from the set of examples in a utility preserving manner to generate a pair of modified examples, where the utility preserving manner includes modifying the example without changing an original meaning or expected label of the example, and where the pair of modified examples share the same expected label, attacking the machine-learning model with the pair of modified examples, where the attacking comprises: (i) inputting the pair of modified examples into the machine-learning model while maintaining the same expected label unknown to the machine-learning model, and (ii) generating, by the machine-learning model, a pair of predictions for the pair of modified examples, comparing the pair of predictions to determine whether the pair of predictions are the same or different; and in response to the pair of predictions being different, adding the pair of modified examples to a set of adversarial examples.

In some embodiments, the method further comprises training the machine-learning model or a different machine-learning model using the set of adversarial examples, wherein the training comprises annotating each example in the set of adversarial examples with an expected label to obtain annotated adversarial examples, feeding the annotated adversarial examples to the machine-learning model or the different machine-learning model, and learning a plurality of model parameters using the annotated adversarial examples based on maximizing or minimizing an objective function.

In some embodiments, the method further comprises in response to the pair of predictions being different and prior to adding the pair of modified examples to the set of adversarial example pairs, determining individually whether each modified example of the pair of modified examples is a true adversarial example, and limiting the addition of the modified examples to the set of adversarial examples as only being the addition of the modified examples deemed to be true adversarial examples to the set of adversarial examples.

In some embodiments, the machine-learning model is part of a chatbot system.

In some embodiments, the machine-learning model is a named entity recognition model, an intent recognition model, or an image recognition model.

In some embodiments, the modifying comprises adding noise into the example.

In some embodiments, the modifying comprises selecting one or more letters or words from the example, and performing an insert, delete, or replace operation on the one or more letters or words.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

The foregoing, together with other features and embodiments will become more apparent upon referring to the following specification, claims, and accompanying drawings.

DETAILED DESCRIPTION

Figure 1:
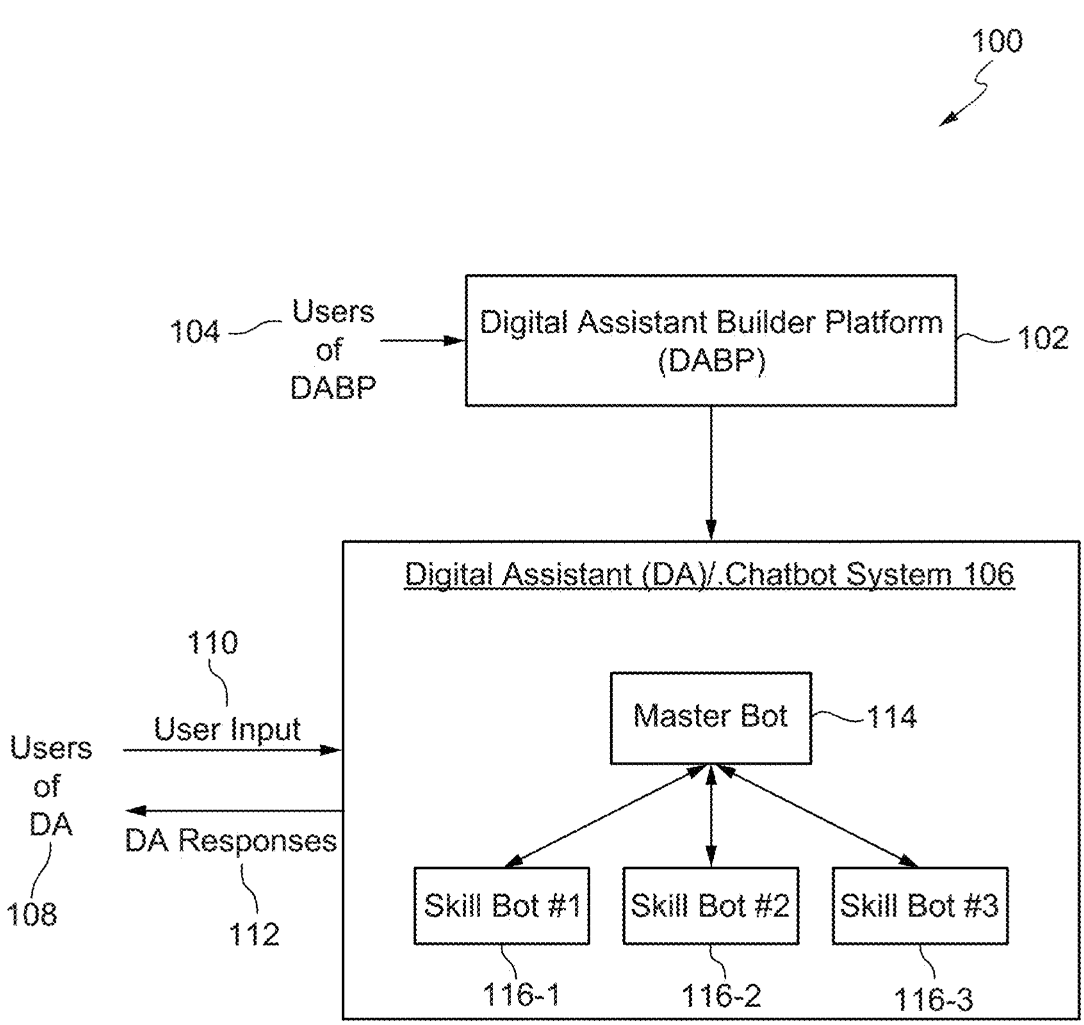
FIG. 1 is a simplified block diagram of an environment incorporating a chatbot system in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word “exemplary” is used herein to mean “serving as an example, instance, or illustration.” Any embodiment or design described herein as “exemplary” is not necessarily to be construed as preferred or advantageous over other embodiments or designs.

Introduction

In recent years, new algorithms have been proposed to deal with the problem of how to automatically generate adversarial examples. For example, Goodfellow et al. (Ian J Goodfellow, Jonathon Shlens, and Christian Szegedy. Explaining and harnessing adversarial examples. In Proceedings of the 2015 International Conference on Learning Representation) is a Fast Gradient Sign Method (FGSM) based white-box algorithm, where the authors claim that by adding a small perturbation to a panda image the attacking algorithm successfully fools GoogLeNet (Szegedy, Christian, Liu, Wei, Jia, Yangqing, Sermanet, Pierre, Reed, Scott, Anguelov, Dragomir, Erhan, Dumitru, Vanhoucke, Vincent, and Rabinovich, Andrew. Going deeper with convolutions. Technical report, arXiv preprint arXiv:1409.4842, 2014a) and makes it misclassify the adversarial panda image as a gibbon. Biggio et al. (B. Biggio, I. Corona, D. Maiorca, B. Nelson, N. Šrndić, P. Laskov, G. Giacinto, and F. Roli, “Evasion attacks against machine-learning at test time,” in Joint European Conference on Machine-learning and Knowledge Discovery in Databases. Springer, 2013, pp. 387-402) is another gradient based attacking method, where the authors generate adversarial examples against a linear classifier, support vector machine (SVM), and a neural network by manipulating the gradient of discriminant functions. Lian et al. (Bin Liang, Hongcheng Li, Miaoqiang Su, Pan Bian, Xirong Li, and Wenchang Shi. 2017. Deep Text Classification Can be Fooled. arXiv preprint arXiv: 1704.08006 (2017)) is another work, where the authors extend the idea of FGSM to text data. By defining three different operations (insert, remove, modify) and manipulating the magnitude of the cost gradient, they successfully generate text adversarial examples to fool the DNN-based classifiers.

Compared to white-box attack, black-box attacking seems more attractive, as the techniques are model agnostic and do not assume any prior knowledge of the victim model's internal architecture and parameters. Black-box models only need access to the inputs and outputs of the victim models. The victim models can be as complicated as a multi-layer deep neural network or as simple as a linear regression model. In Jin et al. (Di Jin, Zhijing Jin, Joey Tianyi Zhou, and Peter Szolovits. Textfool: Fool your model with natural adversarial text. http://groups.csail.mit.edu/medg/ftp/psz-papers/2019% 20Di%20Jin.pdf, 2019) the authors use a black box attack method to attack NLP models, by carefully choosing synonyms for some selected key words and applying some other techniques like filtering out stop words, calculating semantic similarity between texts, the authors claim they outperform state-of-the-art attacks in terms of success rate and perturbation rate. Gao et al. (Ji Gao, Jack Lanchantin, Mary Lou Soffa, and Yanjun Qi. 2018. Black-box generation of adversarial text sequences to evade deep learning classifiers. arXiv preprint arXiv:1801.04354) takes similar ideas as Jin et al., but with different ways of selecting important words and transforming tokens. Jia et al. (Robin Jia and Percy Liang. 2017. Adversarial Examples for Evaluating Reading Comprehension Systems. In Proc. Of the 2017 Conference on Empirical Methods in Natural Language Processing (EMNLP 2017). Copenhagen, Denmark, 2021-2031) is an alternative work to attack reading comprehension systems where they fool the victim models by adding meaningless sentences to the end of a paragraph, which maintains the same semantics of the paragraph and the question answers.

Although these existing attack methods can generate adversarial examples, they usually require labeled data as inputs for the attack algorithms, which can be hard to procure in real world applications. To address these problems and others, the present disclosure introduces adversarial attack techniques which release the labeling constraint and utilizes unlabeled data as inputs, thus dramatically increasing the number of adversarial examples that can be produced. The proposed algorithm and adversarial attack techniques for variant inconsistency (VI) is based on a simple but effective logic: assume a given input has only one correct prediction, if a model produces different predictions, then at least one of them must be wrong. By applying VI, it is possible to remove the constraint of needing labelled data to create useful adversarial examples to train machine-learning models One exemplary embodiment of the present disclosure is directed a computer-implemented process comprising: obtaining a set of input examples for attacking a machine-learning model, where the set of examples do not have corresponding labels; modifying an example from the set of examples in a utility preserving manner to generate a pair of modified examples, where the utility preserving manner includes modifying the example without changing an original meaning or expected label of the example, and where the pair of modified examples share the same expected label, attacking the machine-learning model with the pair of modified examples, where the attacking comprises: (i) inputting the pair of modified examples into the machine-learning model while maintaining the same expected label unknown to the machine-learning model, and (ii) generating, by the machine-learning model, a pair of predictions for the pair of modified examples, comparing the pair of predictions to determine whether the pair of predictions are the same or different; and in response to the pair of predictions being different, adding the pair of modified examples to a set of adversarial examples.

Bot Systems

The adversarial attack techniques described herein for generating adversarial examples can be used as an effective way to defend a model against adversarial attacks. In various embodiments, the models may be implemented as part of a digital assistant; however, it should be understood that the techniques described herein are applicable in other contexts such as image recognition. A digital assistant is an artificial intelligent driven interface that helps users accomplish a variety of tasks in natural language conversations. For each digital assistant, a customer may assemble one or more skills. Skills (also described herein as chatbots, bots, or skill bots) are individual bots that are focused on specific types of tasks, such as tracking inventory, submitting timecards, and creating expense reports. When an end user engages with the digital assistant, the digital assistant evaluates the end user input and routes the conversation to and from the appropriate chatbot. The digital assistant can be made available to end users through a variety of channels such as FACEBOOK® Messenger, SKYPE MOBILE® messenger, or a Short Message Service (SMS). Channels carry the chat back and forth from end users on various messaging platforms to the digital assistant and its various chatbots. The channels may also support user agent escalation, event-initiated conversations, and testing.

Intents allow the chatbot to understand what the user wants the chatbot to do. Intents are comprised of permutations of typical user requests and statements, which are also referred to as utterances (e.g., get account balance, make a purchase, etc.). As used herein, an utterance or a message may refer to a set of words (e.g., one or more sentences) exchanged during a conversation with a chatbot. Intents may be created by providing a name that illustrates some user action (e.g., order a pizza) and compiling a set of real-life user statements, or utterances that are commonly associated with triggering the action. Because the chatbot's cognition is derived from these intents, each intent may be created from a data set that is robust (one to two dozen utterances) and varied, so that the chatbot may interpret ambiguous user input. A rich set of utterances enables a chatbot to understand what the user wants when it receives messages like "Forget this order!" or "Cancel delivery!"—messages that mean the same thing but are expressed differently. Collectively, the intents, and the utterances that belong to them, make up a training corpus for the chatbot. By training a model with the corpus, a customer may essentially turn that model into a reference tool for resolving end user input to a single intent. A customer can improve the acuity of the chatbot's cognition through rounds of intent testing and intent training.

A bot (also referred to as a skill, chatbot, chatterbot, or talk bot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or SMS), virtual private assistants (such as Amazon Dot, Echo, or Show, Google Home, Apple HomePod, etc.), mobile and web app extensions that extend native or hybrid/responsive mobile apps or web applications with chat capabilities, or voice based input (such as devices or apps with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may comprise a set of one or more utterances associated with the intent. For instance, an intent for ordering pizza can have various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further comprise named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 comprises a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for an utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various NLP related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford Natural Language Processing (NLP) Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots," respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using simple user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child (or sub) bot paradigm or architecture. According to this paradigm, a digital assistant is implemented as a master bot that interacts with one or more child bots that are skill bots. For example, in the embodiment depicted in FIG. 1, digital assistant 106 comprises a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a CRM bot for performing functions related to customer relationship management (CRM), an ERP bot for performing functions related to enterprise resource planning (ERP), an HCM bot for performing functions related to human capital management (HCM), etc. This way the end user or consumer of the digital assistant need only know how to access the digital assistant through the common master bot interface and behind the scenes multiple skill bots are provided for handling the user request.

In certain embodiments, in a master bot/child bot infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 comprising a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:

(1) Configuring settings for a new skill bot
(2) Configuring one or more intents for the skill bot
(3) Configuring one or more entities for one or more intents
(4) Training the skill bot
(5) Creating a dialog flow for the skill bot
(6) Adding custom components to the skill bot as needed
(7) Testing and deploying the skill bot Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a predictive model is generated that is configured to take an utterance as input and output an intent inferred for the utterance by the predictive model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a predictive model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:

(a) a context section (b) a default transitions section (c) a states section

Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition, names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
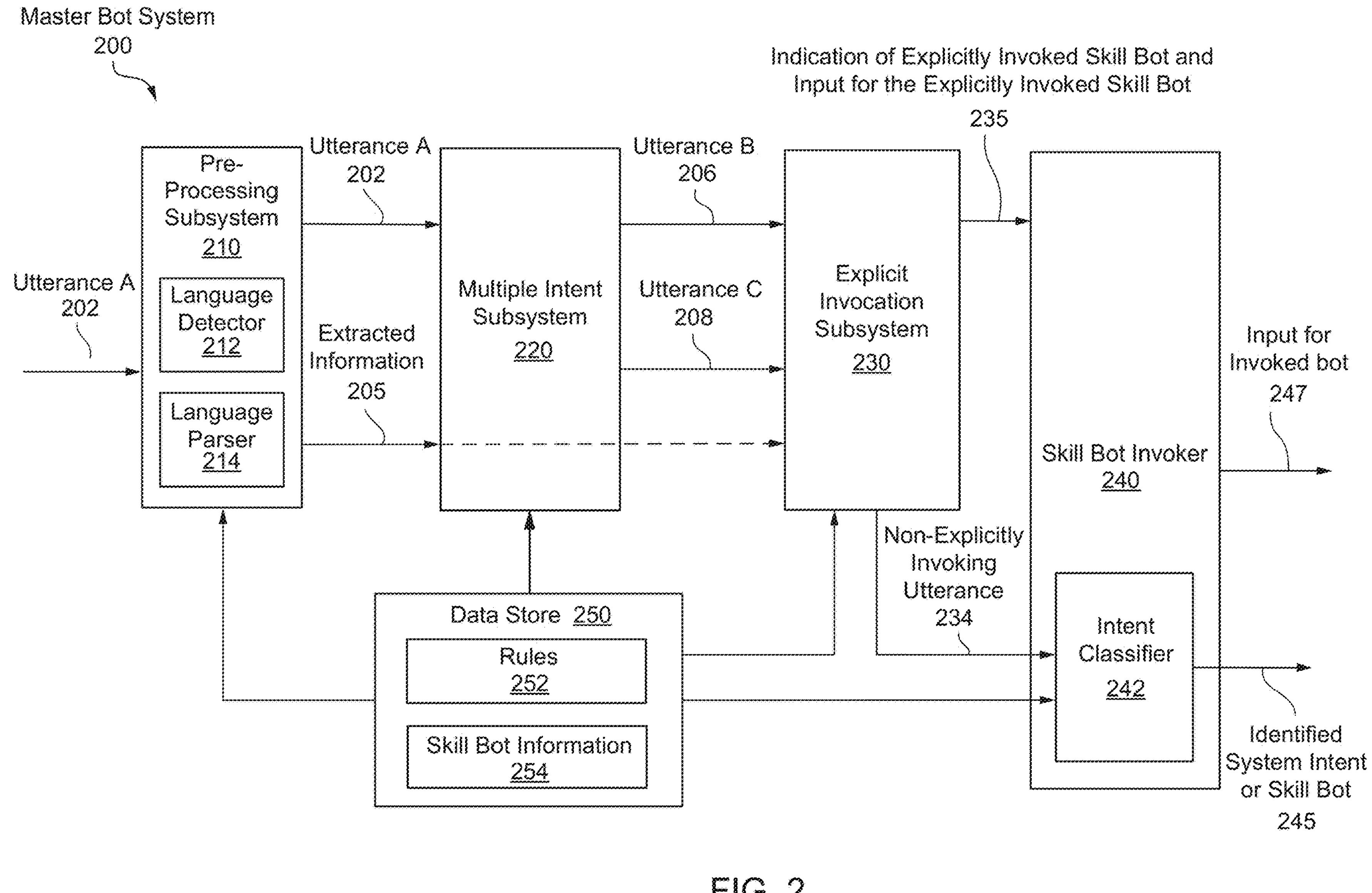
FIG. 2 is a simplified block diagram of a computing system implementing a master bot in accordance with various embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g. a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit comprising multiple sentences.

Figure 3:
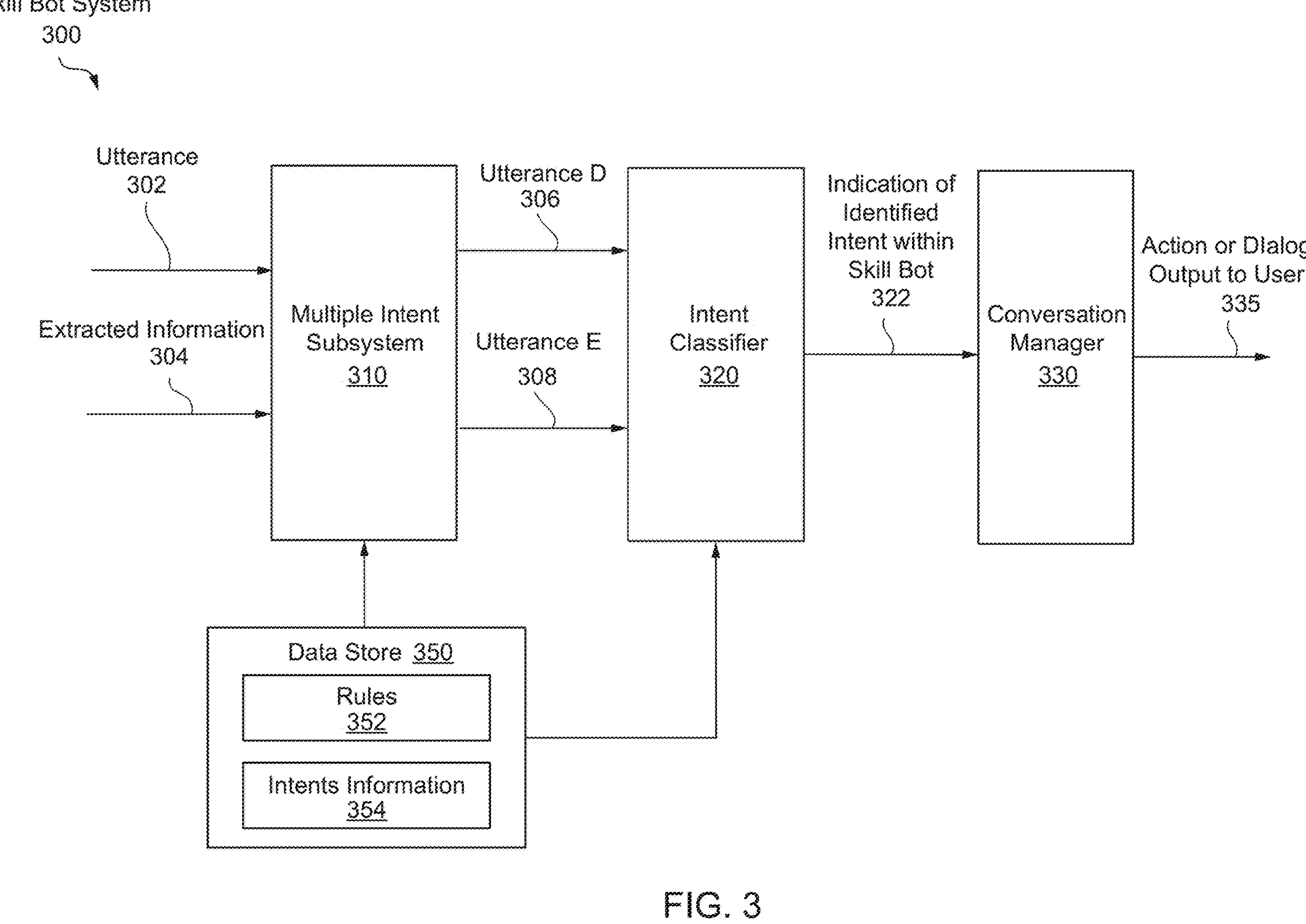
FIG. 3 is a simplified block diagram of a computing system implementing a skill bot in accordance with various embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g. "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through back-propagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 comprises one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent and can determine additional actions or dialog in response to subsequent utterances received during the conversation.

Data store 350 comprises one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

Variant Inconsistency Attack (VIA)

As described herein, the idea behind VIA is a simple logic: assume a given input has only one correct prediction, if a model produces two different predictions, then at least one of them must be wrong. This simple logic can be extended to treat the input and its utility preserving variants as the same input set, and given the variants are generated in a utility preserving way, the model can be expected to be consistent for all the instances in the input set.

For example, assume a trained supervised machine-learning model M is obtained and then M is fed with a new example x1, which has a unique expected prediction. M generates an output y1 for this x1. Subsequently, x1 is modified with the constraint that the original "meaning" cannot be changed, to produce a new example x2. In other words, x2 is a utility preserving variant of x1. Given this construction the corresponding expected prediction of x2 should be exactly the same as prediction for x1. Thereafter, pass x2 to M and receive the output y2. Now if the two predictions y1 and y2 are observed to be actually different, at least one of predictions must be wrong! Here the difference between x1 and x2 is the "variation" and the potential difference between y1 and y2 is the "inconsistency". Essentially, the inconsistent outputs for utility preserving variants of an input fit nicely into the adversarial attack paradigm. A formal description of this logic is provided in the following Algorithm 1:

---

Inputs:
M: A pretrained supervised machine-learning model, which is the subject of an adversarial attack;
X: A set of input examples without the corresponding labels;
Outputs:
A set of potential adversarial example pairs
Steps:
1. Initialize output list: adversarial_examples = [ ]
2. For each $x_i$ in X:
3. modified_pairs = modify_without_changing_expected_label($x_i$)
4. For $x_{i\_modified1}$, $x_{i\_modified2}$ in modified_pairs:
5. //$x_{i\_modified1}$ and $x_{i\_modified2}$ share the same expected label, which
6. // is unknown to the model M
7. $y_{i\_modified1}$ = M($x_{i\_modified1}$)
8. $y_{i\_modified2}$ = M($x_{i\_modified2}$)
9. if $y_{i\_modified1}$ != (does not equal) $y_{i\_modified2}$:
10. Add ($x_{i\_modified1}$, $x_{i\_modified2}$) into adversarial_examples
11. Return adversarial_examples

---

Algorithm 1 is a basic version of a VI algorithm; however, it should be understood that several different variants can be used in practice.

In some embodiments, a VI algorithm (e.g., Algorithm 1) is run on all the examples in modified_pairs from the set of input examples to test inconsistency. In alternative embodiments, the VI algorithm (e.g., Algorithm 1) is stopped immediately once a pair of potential adversarial examples is found, which may decrease the running cost but may also cause a miss on good adversarial example pairs at the same time. This option may be especially useful when dealing with a huge attack set of input examples. As should be understood, either technique of using a VI algorithm for adversarial attack does not require the set of input examples to have associated labels. In machine-learning, data labeling is the process of identifying raw data (images, text files, videos, etc.) and adding (annotating) one or more meaningful and informative labels to provide context so that a machine-learning model can learn from it. For example, labels might be ground truths that indicate whether a photo contains a bird or car, which words were uttered in an audio recording, or if an x-ray contains a tumor. Data labeling is typically required for a variety of use cases including computer vision, natural language processing, and speech recognition. However, not requiring labels as with the VI algorithm makes it possible to find an unlimited number of potential adversarial examples as long as more inputs are provided, which is especially easy to be satisfied for text data.

In the output list (set of potential adversarial example pairs), each element is a tuple containing two potential adversarial example candidates. Although it cannot be guaranteed that both of the elements will fool the victim model M, it is determined by the VI algorithms that at least one of the elements will make the victim model M give a wrong prediction. And for most instances, it is easy to check manually by a user if any element in each of the pair is a true adversarial example, especially for natural language or image recognition tasks.

Two related techniques are LIME (Marco Tulio Ribeiro, Sameer Singh, and Carlos Guestrin. "Why should i trust you?: Explaining the predictions of any classifier". In: Proceedings of the 22nd ACM SIGKDD International Conference on Knowledge Discovery and Data Mining. ACM. 2016, pp. 1135-1144) and Anchors (Marco Tulio Ribeiro, Sameer Singh, and Carlos Guestrin. 2018. Anchors: High-precision model agnostic explanations. In AAAI Conference on Artificial Intelligence). Both the techniques first make perturbations to the original inputs on top of which they either build a local surrogate linear model (LIME) or build some rules (Anchors) to explain the model in a black-box way. The VI algorithm (e.g., Algorithm 1) described herein shares similar ideas in terms of creating the potential adversarial. example candidate pairs ("modified_pairs" in Algorithm 1), however, the VI algorithm tries to test if the outputs of the potential candidates are different from the original inputs afterwards to filter out all the real adversarial examples, which is completely different from LIME or Anchor. Thus, the VI algorithm releases the restraint of requiring pre-labeled inputs, which may significantly increase the search capability of an adversarial attacking algorithm.

With respect to Algorithm 1, the modify_without_changing_expected_label function in line 3 is how the original input examples are modified in a utility preserving way. The steps of this modification technique may be different for different applications of the VI algorithm, especially for applications across different modalities like vision, text, image processing, etc. This is also the place where users can modify the VI algorithm in several intuitive ways for creating utility preserving variants. A detailed explanation of such approaches is provided herein with respect to Example 1 and Example 2.

The systems and methods implemented in various embodiments may be better understood by referring to the following examples.

Example 1—Attacking Image Recognition Model

The data set used in this experiment is the MNIST database of handwritten digits (Y. LeCun, L. Bottou, Y. Bengio, and P. Haffner. "Gradient-based learning applied to document recognition." Proceedings of the IEEE, 86(11): 2278-2324 November 1998), which contains 60,000 examples for training and 10,000 examples for testing. All the examples are square 28×28 pixel grayscale images of handwritten single digits between 0 and 9.

A Convolutional Neural Network (CNN) was trained for this image recognition task and the goal was to find a way to automatically detect some potential adversarial examples which can fool the CNN model. The architecture of CNN is as follows:

After training, the CNN model achieved a relatively good performance on the test data set with average macro precision 0.989, recall 0.989 and f1 0.989.

In order to implement the modify function—modify_without_changing_expected_label: a relatively simple but effective approach was taken for this image recognition task. The approach included adding a normal noise with mean 0 and standard deviation 0.05 to the examples in the attacking data set. Since the final goal is to fool the victim model, it is fine to accept polluted examples which may potentially contain negative pixel values after modification as long as they can successfully make the victim model give wrong predictions.

The VI algorithm (Algorithm 2) used for Example 1 is described below, which is slightly different from the basic Algorithm 1 described above:

Algorithm 2:

```
Input:
M: A trained CNN model which is to be attacked;
X: A set of input examples without the corresponding labels;
Output:
A subset of all the potential adversarial examples
Steps:
 1. Initialize output list: adversarial_examples = [ ]
 2. For each x_i in X:
 3.       noise1 = random.normal(mean=0, standard deviation=0.05,
 4.             size=(28,28))
 5.       noise2 = random.normal(mean=0, standard deviation=0.05,
 6.             size=(28,28))
 7.       x_modified1 = xi + noise1
 8.       x_modified2 = xi + noise2
 9.       //x_i_modified1 and x_i_modified2 share the same expected label, which
10.       // is unknown to the model M
11.       y_i_modified1 = M(x_i_modified1)
12.       y_i_imodified2 =M(x_i_modified2)
13.       if y_i_modified1!= (does not equal) y_i_modified2:
14.             Add (x_i_modified1, x_i_modified2) into adversarial_examples
15.             break
16. Return adversarial_examples
```

If the above Algorithm 2 is continuously run against the set of input examples, an unlimited number of potential adversarial example pairs may be obtained (lines 3 and 4 provide a random function, where every run will return different values) and for each pair at least one candidate is a true adversarial example.

Table 1 shows running Algorithm 2 against the set of input examples ten times.

TABLE 1

| | Run 1 | Run 2 | Run 3 | Run 4 | Run 5 | Run 6 | Run 7 | Run 8 | Run 9 | Run 10 |
|---|---|---|---|---|---|---|---|---|---|---|
| # Found Pairs | 54 | 39 | 55 | 40 | 47 | 42 | 51 | 59 | 49 | 51 |

One single convolutional layer with 64 filters, whose sizes are (4,4), followed by a max pooling layer with size (3,3). The outputs of the pooling layer were then flattened to feed into a fully connected layer with size 100, which was then mapped to a 10-dimension outputs representing the ten digits from 0 to 9.

Since some initial examples for attacking are needed, for convenience, 20% of the training data (12000 examples) are randomly selected for attacking use. The remaining 48000 examples form the actual training dataset. Note it is not necessary to use the corresponding 12000 labels associated with the attacking inputs.

Figures 4A, 4B:
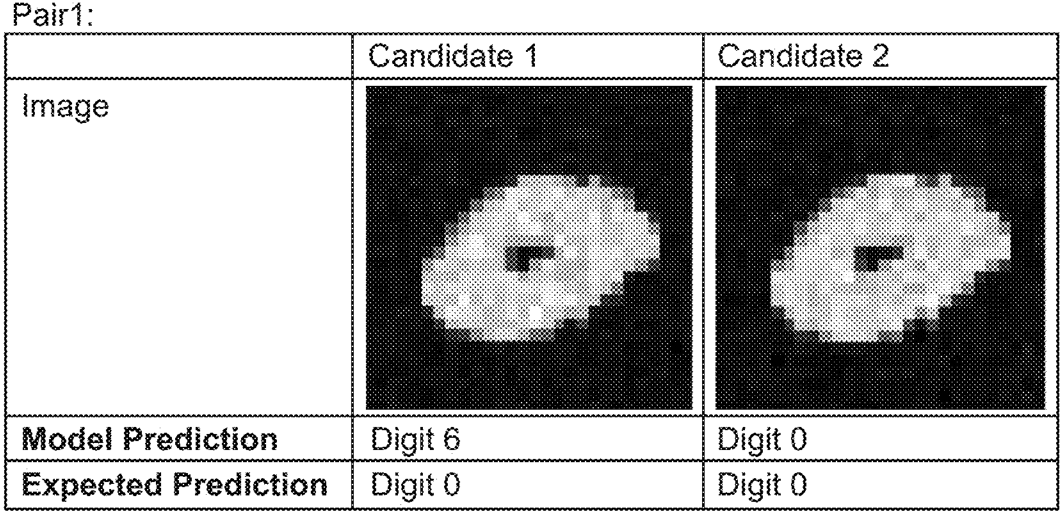
FIGS. 4A and 4B illustrate adversarial example pairs of images in accordance with various embodiments.

In each of the above pairs there is at least one true adversarial example, and thus in total at least 487 adversarial examples were obtained in 10 runs of the set of input examples. Two adversarial example pairs from run 10 are shown in FIG. 4A. As mentioned in the preceding section, after this potential adversarial example pair is found, it is possible to identify (e.g., via user review) that Candidate 1 is a true adversarial example since the expected prediction should be zero. FIG. 4B shows two more adversarial example pairs. In this example, it can be observed that both of Candidate 1 and Candidate 2 are true adversarial examples, since the expected predication should be three.

Example 2—Attacking Named Entity Recognition Model

It is much more effective to attack a supervised model with more common labels than to attack a supervised model with more specific labels (e.g., the CNN model in Example 1). The reason is that common labels are much easier to be found compared to specific labels. For example, in Name Entity Recognition the common entities include "Person", "Location", "Organization" etc., which are very likely to appear in common texts. So, it is much easier to collect the data to use as the attack inputs.

In Experiment 2, a subset of the common crawl corpus dataset (http://commoncrawl.org/the-data/get-started/), which contains 50K randomly selected sentences, was used as the attack inputs. A few examples from this dataset are shown below:

Example A: do i need a skip permit for fitzrovia?

Example B: pops looks delicious . . . this is the first time to ur blog . . . u got good recipes . . .

Example C: pay special attention to the wired article above, it's very comprehensive.

A Bidirectional Encoder Representations from Transformers (BERT) based named entity recognition (NER) model was trained, which serves as the victim model. The goal is to detect the adversarial examples which can fool this pretrained model. The entities used in this experiment include "Person", "Location", "Organization", "Currency", "Time or Date", "Number".

In order to implement the modify function—modify_without_changing_expected_label: a relatively simple but effective approach was taken for introducing typos to the words. The approach included first randomly selecting a few words from the original utterance and then applying one of three modifications (insert, delete and replace) to words. The full algorithm is shown below in Algorithm 3. An alternative way to implement the above modify function is by using synonyms.

The VI algorithm (Algorithm 3) used for Example 2 is described below, which is slightly different from the basic Algorithm 1 described above:

Algorithm 3:

```
Input:
M: A trained NER model which is to be attacked;
X: A set of input examples without the corresponding labels;
S: A threshold used to determine if two strings are semantically similar
Output:
A subset of all the potential adversarial examples
Steps:
 1.   Initialize output list: adversarial_examples = [ ]
 2.   For each x_i in X:
 3.     pivot = xi
 4.     candidate words = RandomPickWordsFrom(pivot)
 5.     For each word wj in candidate words:
 6.         variant_pairs = [ ]
 7.         operations = SelectTypoTypes( )
 8.         cadidates = ApplyTypoOperations(wj, operations)
 9.         For each candidate c_k in candidates:
10.             Create pivot_variant by Replace w_j with c_k in pivot
11.             Add (pivot, pivot_variant) to variant_pairs
12.         inconsistent_pair_list = [ ]
13.         For each pair p_m in variant_pairs
14.             If the two elements in it are inconsistent
15.                 Add pair pm into inconsistent_pair_list
16.         if inconsistent_pair_list is not empty
17.             sort inconsistent_pair_list by semantic similarity
18.             Add inconsistent_pair_list [0] to adversarial_examples
19.             Break
```

-continued

```
20.         else
21.             If variant_pairs is not empty
22.                 Sort variant_pairs by semantic similarity
23.                 p1, p2 = variant_pairs [0]
24.                 pivot = p2
26.   Return adversarial_examples
```

In Algorithm 3. for each original example (pivot). first a few candidate words are randomly selected. Second. for the candidate words, apply a modification operation (e.g., a typo operation) to obtain modified words, and use the modified words to replace the original word in the original example to get the modified examples (pivot variant(s)). Third, compare the pivot variant(s) with pivot to see if they are inconsistent. If so, the pivot variant(s) are added to an auxiliary list. Fourth, after the comparison of the (pivot variant(s) and pivot) pairs, the auxiliary list is sorted by string similarity and the pivot variant(s) with the highest similarity score is returned or identified. If the auxiliary list is empty after the comparison of the (pivot variant(s) and pivot) pairs, the pivot is updated to be the one with the highest similarity score and Algorithm 3 returns to the second step to modify the next candidate word to get the new modified example and then repeat the process in the third and fourth steps.

By way of example: assume the original example (pivot) is "Edison is an employee of Oracle." and "Edison" and "employee" are selected as two candidate words. Then a modification function (e.g., typo) is applied to the word "Edison" and the word "Edison" is modified to ("Edisson" and "Ediso"). So now the pivot variant will be "Edisson is an employee of Oracle" and "Ediso is an employee of Oracle." And now "Edison is an employee of Oracle." (pivot) is compared with "Edisson is an employee of Oracle." (pivot variant) and "Ediso is an employee of Oracle" (pivot variant) to see if the pivot variants are inconsistent with the pivot. If so, then the pivot variants are put into an auxiliary list. Case 1: Let's assume both of the two pivot variants are inconsistent with pivot, in this case the auxiliary list is sorted based on the similarity between and pivot variant and the pivot. Let's say "Edisson is an employee of Oracle" has higher similarity, in this case "Edison is an employee of Oracle" and "Edisson is an employee of Oracle" can be directly added as an adversarial example pair to the return list. Case 2: if none of the pivot variants is inconsistent with pivot, then the pivot is updated to be "Edisson is an employee of Oracle" since it has higher similarity score. And then the modification function (e.g., typo) is applied to the second candidate word "Oracle" and the above process is repeated.

One important detail in Algorithm 3 is line 14. Here it is defined that if and only if two candidates have different entities and different contexts at the same time, then those two candidates are inconsistent. The entities associated with each candidate are given by the victim model M and the contexts are all the other parts except the entities.

In Example 2, to be efficient, different orders of the candidate words selected at line 4 were not considered in Algorithm 3, instead its natural order was used. If the size of the attack inputs is medium or small, initially it is possible to get all the possible perturbations of the candidate words in each of the inputs or by applying heuristic methods to first rank the words, then for each of the possible orders Algorithm 3 can be applied. There were in total 26773 potential adversarial examples pairs found by Algorithm 3, which means there were at least 26773 adversarial examples identified.

Two of the adversarial example pairs found by the algorithms are shown below in Table 2.

TABLE 2

| | Candidate 1 | Candidate 2 |
|---|---|---|
| | Pair 1 | |
| Utterance | Why do you need my phone number and address? | why do you ned my phone number and address? |
| Model Prediction | None | PERSON: ned |
| Expected Prediction | None | None |
| | Pair 2 | |
| Utterance | There are 5 of us total. | there are 5 of us toaal. |
| Model Prediction | NUMBER: 5; LOCATION: us | NUMBER: 5 |
| Expected Prediction | NUMBER: 5 | NUMBER: 5 |

As shown, there is small difference between Candidate 1 and Candidate 2 in both of these two pairs and the corresponding semantic meanings don't change. This is enough to make the victim model give wrong predictions. In Pair 1, Candidate 2 wrongly recognizes "ned" as entity "PERSON"; in Pair 2 candidate 1 wrongly recognizes "us" as "LOCATION".

Conclusion

Consequently, it has been demonstrated by these examples that VI is conceptually a good fit for adversarial attack in the sense that the technique can be easily applied to find potential adversarial pairs without requesting any prelabeled data as attack inputs. The experiments on both image recognition and name entity recognition were conducted to demonstrate the usefulness and effectiveness of applying VI to adversarial attack.

Systems and Techniques for Variant Inconsistency Attack

Figure 5:
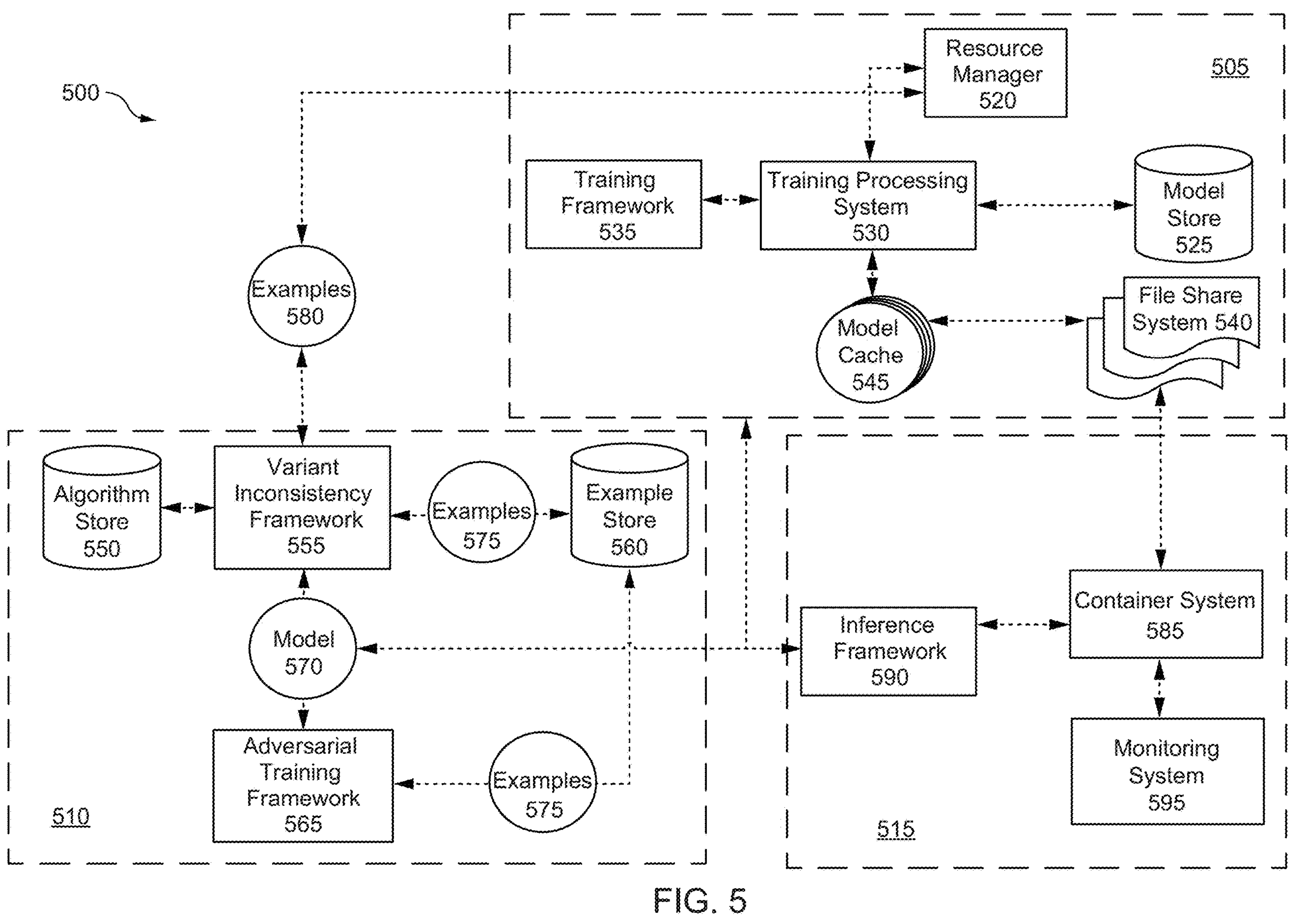
FIG. 5 is a simplified block diagram illustrating a computing environment for implementing a variant inconsistency attack in accordance with various embodiments.

FIG. 5 is a block diagram illustrating a computing environment 500 for implementing a variant inconsistency attack in accordance with various embodiments. As shown, the computing environment 500 comprises a training system 505, a variant inconsistency attack system 510, and a model deployment system 515 interconnected via one or more networks of communication, for example as part of a chatbot system as described in detail herein.

The training system 505 comprises a resource manager 520, a model store 525, a training processing system 530, a training framework 535, and a file share system 540 with a model cache 545. The resource manager 520, training processing system 530, and training framework 535 configure one or more models (e.g., a machine learning language model) for performing a task using one or more training technologies. The one or more training technologies may include without limitation: Word2vec, which is a shallow neural network that produces static word embeddings, BERT, which is a Transformer-encoder-based autoencoder language model for creating word embeddings and language modeling using fine-tuning-based and encoder-based methods, ELMo, which is a Long short-term memory (LSTM) based model for creating word embeddings and language modeling using encoder-based methods, GPT, which is a transformer-decoder-based autoregressive language model for creating word embeddings and language modeling using fine-tuning-based methods, XLNet, which is an autoregressive and denoise autoencoder based model for language modeling, or any combination thereof. The algorithms and hyperparameters for the one or more pre-training technologies may be identified by a user (e.g., a developer) and used for configuring the model. Additionally or alternatively, algorithms and hyperparameters may be obtained by the resource manager 520 and training processing system 530 in an automated manner such as data retrieval, evaluation, optimization, and the like.

The machine-learning model may be part of a chatbot system such as a named entity recognition model, an intent recognition model, or an image recognition model. In some instances, the machine=learning model is a convolutional neural network ("CNN"), e.g. an inception neural network, a residual neural network ("Resnet"), or a recurrent neural network, e.g., long short-term memory ("LSTM") models or gated recurrent units ("GRUs") models, other variants of Deep Neural Networks ("DNN") (e.g., a multi-label n-binary DNN classifier or multi-class DNN classifier for single intent classification. A machine-learning model can also be any other suitable machine-learning model trained for natural language processing, such as a Naive Bayes Classifier, Linear Classifier, Support Vector Machine, Bagging Models such as Random Forest Model, Boosting Models, Shallow Neural Networks, or combinations of one or more of such techniques—e.g., CNN-HMM or MCNN (Multi-Scale Convolutional Neural Network). The chatbot system may employ the same type of machine-learning model or different types of machine-learning models for recognizing one or more entities in an utterance, determining a likelihood that an utterance is representative of a task that a particular skill bot is configured to perform, predicting an intent from an utterance for a first type of skill bot, and predicting an intent from an utterance for a second type of skill bot. Still other types of machine-learning models may be implemented in other examples according to this disclosure.

The resource manager 520, training processing system 530, and training framework 535 work in combination to train the model (e.g., pre-train, fine-tune, train, etc.). For example, the resource manager 520 may obtain sets of data for training, testing, and validating the model, the training processing system 530 may implement a multi-node network for hosting and training models, and the training framework 535 may execute steps for training the models on the multi-node network using the sets of training data, testing data, and validation data. The purpose of the training is to train the model to help it learn model parameters that can be used in one or more processing tasks (e.g., one or more natural language processing tasks).

The resource manager 520 may acquiring example data, split the example data into a subset of examples for training (e.g., 90%) and a subset of examples for testing and/or validation (e.g., 10%), preprocess the subsets of example, optionally augment the subsets of example, and in some instances annotating the subsets of example with labels. The splitting may be performed randomly (e.g., a 90/10% or 70/30%) or the splitting may be performed in accordance with a more complex validation technique such as K-Fold Cross-Validation, Leave-one-out Cross-Validation, Leave-one-group-out Cross-Validation, Nested Cross-Validation, or the like to minimize sampling bias and overfitting.

The training process for the machine-learning model may include selecting hyperparameters for the machine-learning model and performing iterative operations of inputting examples from the subset of examples into the machine-learning model to find a set of model parameters (e.g., weights and/or biases) that maximizes or minimizes an objective function (e.g., minimizes a cost function(s) such as loss or error function) for the machine-learning model. The hyperparameters are settings that can be tuned or optimized to control the behavior of the machine-learning model. Most models explicitly define hyperparameters that control different features of the models such as memory or cost of execution. However, additional hyperparameters may be defined to adapt the machine-learning model to a specific scenario. For example, the hyperparameters may include the number of hidden units of a model, the learning rate of a model, the convolution kernel width, or the number of kernels for a model.

The training steps executed by the training processing system 530 and the training framework 535 may comprise iteratively, performing training and validation until the model has been sufficiently trained for use in the inference phase. For example, for a supervised learning-based model, the goal of the training is to learn of function "h( )" (also sometimes referred to as the hypothesis function) that maps the training input space X to the target value space Y, h: X→Y, such that h(x) is a good predictor for the corresponding value of y. Various different techniques may be used to learn this hypothesis function. In some techniques, as part of deriving the hypothesis function, an objective function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to maximize or minimize this objective function (e.g., minimize a cost function).

The training techniques may depend on the type of model that is being trained. For example, there are different types of supervised learning models, such as different types of neural network models, support vector machine (SVM) models, and others. Various different training techniques may be used. For example, as previously indicated, a loss or cost function may be defined for the model and back propagation techniques may be used to minimize this loss or minimization function. The resource manager 520, training processing system 530, and training framework 535 may perform training to build and train a neural network model. A neural network or neural network model represents a computational model that is inspired by the way neurons and networks of neurons work in the human brain. A neural network comprises multiple nodes arranged in layers. Each node receives an input from some other nodes, or from an external source, and computes an output. Each input to a node has an associated weight that is assigned based upon the relative importance of that input to other inputs. The node applies a function (activation function) to the weights sum of its inputs and to a bias input to generate the output. The activation function can introduce non-linearity in the output of the node. The layers of a neural network can comprise an input layer comprising one or more input nodes, an output layer comprising one or more output nodes, and zero or more hidden layers sandwiched between the input and output layers, each hidden layer comprising one or more nodes. The outputs of nodes at one layer can be provided or connected as inputs to nodes of another layer. The outputs of the output layer represent the results or predictions made by the neural network processing. The neural network can be implemented using code executing on one or more processors, where the code implements the nodes, the connections between the nodes, the functions performed by the nodes, and the processing flow through the nodes. The neural network may be trained using, for example, back propagation training techniques where the weights associated with inputs to the nodes in the neural network are manipulated with the goal to maximize or minimize the objective function associated with the output(s) provide by the output layer of the neural network.

Once a set of model parameters are identified that minimizes a cost function(s), the model has been trained and can be validated using the subset of examples (testing or validation data set). The validation process includes iterative operations of inputting aspect examples from the subset of examples into the model using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of examples from the subset of examples are input into the model to obtain output (e.g., classes), and the output is evaluated versus ground truth using correlation techniques such as Bland-Altman method and the Spearman's rank correlation coefficients and calculating performance metrics such as the error, accuracy, precision, recall, receiver operating characteristic curve (ROC), etc. Once the model is tested and validated, the training framework 535 outputs the trained model for inferencing or making predictions during an inference or runtime phase based upon real time or inferring data points.

As should be understood, other training/validation mechanisms are contemplated and may be implemented within the computing environment 500. For example, the model may be trained and hyperparameters may be tuned on examples from the subset of examples and the examples from the subset of examples may only be used for testing and evaluating performance of the model. Moreover, although the training mechanisms described herein focus on training a new model. These training mechanisms can also be utilized to fine-tune existing models trained from other datasets. For example, in some instances, an model might have been pre-trained using samples from datasets in one domain. In those cases, the models can be used for transfer learning and retrained/validated using examples from another domain.

After the model has been trained, the model may then be stored in the model store 525 where the model can be obtained by one or more users for fine-tuning and/or inferencing or making predictions during the inference or runtime phase based upon real time or inferring data points. For example, a customer may obtain and use a pre-trained model to identify named entities in text. Additionally or alternatively, the model may be stored in the model cache 545 and availed to various tenants of a distributed environment such as the file share system 540. The model in the model cache 545 can either be obtained or accessed via the file share system 540 by one or more tenants for fine-tuning and/or inferencing or making predictions during the inference or runtime phase based upon real time or inferring data points.

The variant inconsistency attack system 510 comprises a variant inconsistency algorithm store 550, variant inconsistency framework 555, an adversarial example store 560, and an adversarial training framework 565 for adversarial training of a model 570 on adversarial examples 575. The variant inconsistency algorithm store 550 stores various algorithms (e.g., Algorithm 1, Algorithm 2, Algorithm 3, and the like) for identifying adversarial examples 575 to be used in the adversarial training. One or more algorithms from variant inconsistency algorithm store 550 are selected and executed on variant inconsistency framework 555 with a pretrained machine-learning model 570 (e.g., a model from model store 525 or model cache 545). The one or more algorithms may be selected based on the type of original data available for training, testing, or validating the model, the type of modify_without_changing_expected_label function to be used for the original data and/or model, the type of model to be adversarial trained to defend against adversarial attacks, or a combination thereof. Each algorithm is configured to take as input the pretrained machine-learning model 570 (e.g., a model from model store 525 or model cache 545) and a set of input examples 580 without the corresponding labels (e.g., sets or subsets of data for training, testing, or validating the model obtained by the resource manager 520 but without the corresponding labels).

The algorithm and variant inconsistency framework 555 execute the modify_without_changing_expected_label function on various examples from the set of input examples 580 in order to generate pairs or sets of modified examples such as x1 and x2. The modify_without_changing_expected_label function modifies the original input examples in a utility preserving way as described herein in detail. The implementation of this function may be different for various applications depending on the algorithm selected, especially for applications across different modalities like vision and text. The algorithm and variant inconsistency framework 555 execute the pretrained machine-learning model 570 to take as input an example x1, and generate an output y1 for this x1, and take as input a modified example x2, and generate an output y2 for this x2. The algorithm and variant inconsistency framework 555 then determine whether the two predictions y1 and y2 are actually different, and if so determine that at least one of predictions must be wrong. The difference between x1 and x2 is the "variation" and the potential difference between y1 and y2 is the "inconsistency". When the pair of predictions are different, the pair of adversarial examples 575 are added to a set of adversarial example pairs stored in adversarial example store 560. When the pair of predictions are the same, the pair of examples are discarded since neither of the examples are considered to be adversarial. Optionally, a user may review the pair of examples and the pair of predictions prior to addition to the set of adversarial example pairs, determine individually whether each modified example of the pair of modified examples is a true adversarial example 575, and limit the addition of the modified examples to the set of adversarial example pairs as only being the addition of the modified examples deemed by the user to be true adversarial examples 575 to the set of adversarial example pairs.

The adversarial training framework 565 executes a fine-tuning or adversarial training process on the pretrained machine-learning model 570. The fine-tuning or adversarial training process includes re-training the pretrained machine-learning model 570 using adversarial examples 575 from the adversarial example store 560. As a result of the fine-tuning or adversarial training process, the model parameters of the original pre-trained language model 570 are updated to account for the characteristics of the adversarial data and the task the user is interested in the model performing. The adversarial training framework 565 may obtain sets of adversarial examples for training, testing, and validating the pretrained machine-learning model 570, and execute steps for fine-tuning the pretrained machine-learning model 570 using the sets of training data, testing data, and validation data.

The fine-tuning steps executed by the adversarial training framework 565 may comprise iteratively, performing training and validation until the pretrained machine-learning model 570 has been sufficiently trained for use in the inference phase. For example, for a supervised learning-based model, the goal of the training is to learn of function "h( )" (also sometimes referred to as the hypothesis function) that maps the training input space X to the target value space Y, h:X→Y, such that h(x) is a good predictor for the corresponding value of y. Various different techniques may be used to learn this hypothesis function. In some techniques, as part of deriving the hypothesis function, an objective function may be defined that measures the difference between the ground truth value for an input and the predicted value for that input. As part of training, techniques such as back propagation, random feedback, Direct Feedback Alignment (DFA), Indirect Feedback Alignment (IFA), Hebbian learning, and the like are used to maximize or minimize this objective function. As described with respect to the training system 505, the training techniques may depend on the type of model that is being trained. For example, there are different types of supervised learning models, such as different types of neural network models, support vector machine (SVM) models, and others. Various training techniques may be used depending on the type of pre-trained model to be fine-tuned.

Once a set of model parameters are identified that minimizes a cost function(s), the pretrained machine-learning model 570 has been re-trained or fine tuned and can be validated using a subset of examples (testing or validation data set). The validation process includes iterative operations of inputting examples from the subset of examples into pretrained machine-learning model 570 using a validation technique such as K-Fold Cross-Validation, Leave-one-out Cross-Validation, Leave-one-group-out Cross-Validation, Nested Cross-Validation, or the like to tune the hyperparameters and ultimately find the optimal set of hyperparameters. Once the optimal set of hyperparameters are obtained, a reserved test set of examples from the subset of examples may be input into the model to obtain output (e.g., the predicted class), and the output is evaluated versus ground truth aspects using correlation techniques such as Bland-Altman method and the Spearman's rank correlation coefficients and calculating performance metrics such as the error, accuracy, precision, recall, receiver operating characteristic curve (ROC), etc.

Once the pretrained machine-learning model 570 is tested and validated, the adversarial training framework 565 outputs the model for inferencing or making aspect predictions during an inference or runtime phase based upon real time or inferring data points. For example, after the pretrained machine-learning model 570 is trained, the pretrained machine-learning model 570 has been fine-tuned, or after the pretrained machine-learning model 570 has been exposed to adversarial examples, the model may then be deployed using the model deployment system 515. The model may be deployed in a container based system 585 such as Kubernetes with a health monitoring service 590. The model in container based system 585 can be used for inferencing or making predictions via inference framework 590 during the inference or runtime phase based upon real time or inferring data points. The health monitoring service 595 can monitor the health of the models on the container based system 585, and trigger retraining or fine-tuning of models as needed (e.g., upon detection of drift, adversarial attack, or upon provisioning of a new domain). Although, the models are described as being deployed in a container based system, it should be understood that any other type of system may be used for deploying models in a run time phase without departing from the spirit of the present disclosure.

Figure 6:
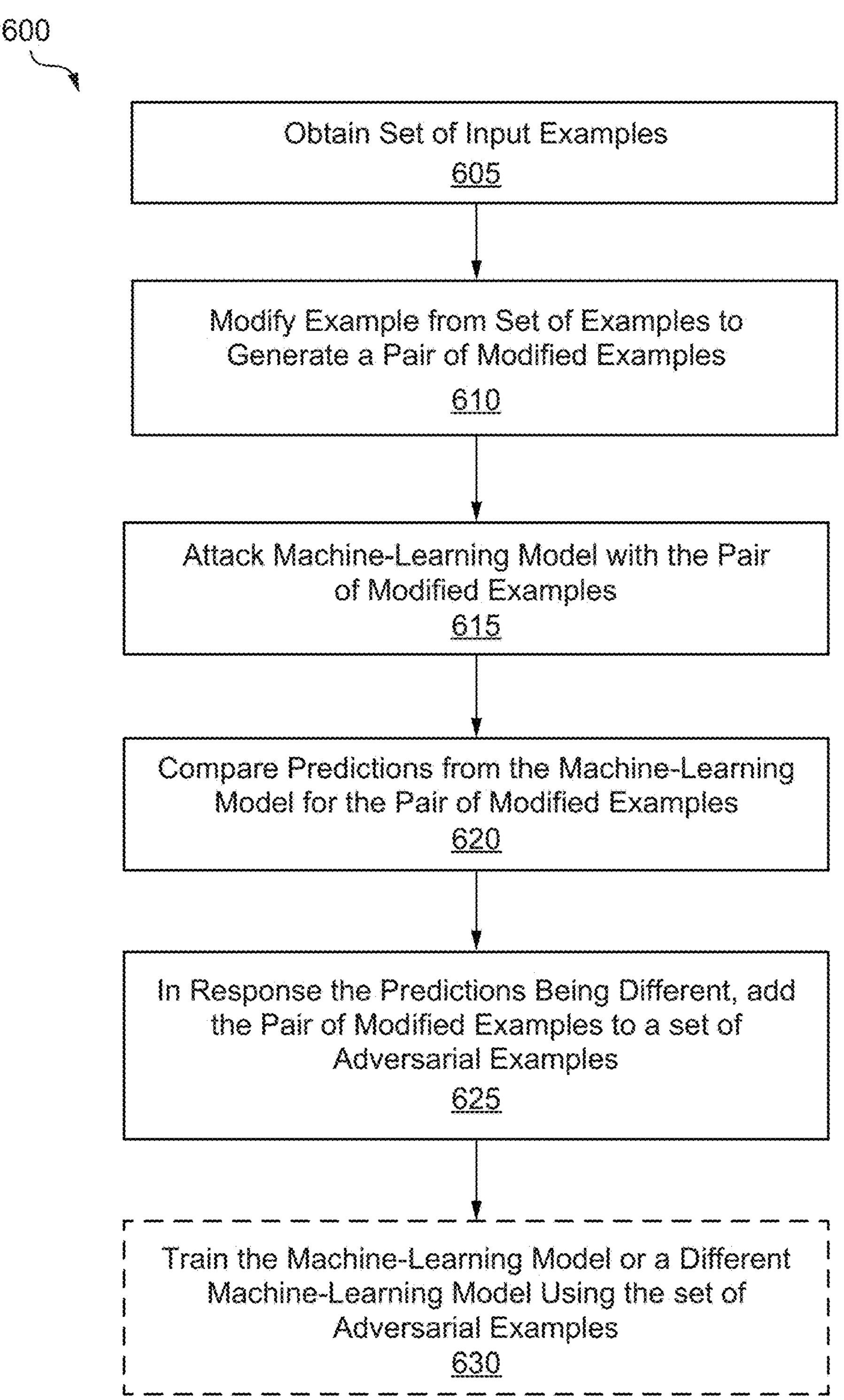
FIG. 6 illustrates a process flow for variant inconsistency attack in accordance with various embodiments.

FIG. 6 is a flowchart illustrating a process 600 for variant inconsistency attack according to various embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in the embodiments depicted in FIGS. 1-3 and 5, the processing depicted in FIG. 6 may be performed by a computing environment (e.g., pre-processing subsystem 210 or environment 500) to generate sets of potential adversarial example pairs for training one or more models (e.g., the intent classifier 242 or 320 or models 570).

At step 605, a set of input examples is obtained for attacking a machine-learning model. The set of examples do not have corresponding labels. In other words, the set of examples have not been tagged with meaningful and informative labels to provide context so that a machine-learning model cannot learn from the meaningful and informative labels (e.g., cannot infer a function from labeled examples). In some instances, the machine-learning model is part of a chatbot system. In certain instances, the machine-learning model is a named entity recognition model.

At step 610, an example from the set of examples is modified in a utility preserving manner to generate a pair of modified examples. The modifying in a utility preserving manner means modifying the example without changing an original meaning or expected label of the example. The pair of modified examples share the same expected label. In some instances, the modifying comprises adding noise into the example. In other instances, the modifying comprises selecting one or more letters or words from the example, and performing an insert, delete, or replace operation on the one or more letters or words. Table 3 provides examples of utility preserving transformations that may be used to modify the examples in a utility preserving manner.

TABLE 3

| | Transformation | Relevant models | Method(s) to automatically generate transformation | How to ensure utility-preservation? |
|---|---|---|---|---|
| 1 | Introduce typo | Text classification, NER | Replace any word with version with typo. | Typos should be taken from a list of common typos. Typos are not random, and most randomly generated typos may not be realistic. |
| 2 | Introduce spelling mistake | Text classification, NER | Replace any word with incorrectly spelled version. | Spelling mistakes should be taken from a list of common mistakes. Mistakes can be at word or character sequence level e.g. “disappoint” —> "dissapoint", “ei” —> “ie” etc. |
| 3 | Insert word | Text classification, NER | Add: Random stop word Random garbage word | Only add stop words. Adding contentful words could change sentence meaning. |
| 4 | Delete word | Text classification, NER | Delete random stop word. | Only delete stop words. Sentence meaning could still change in some cases. |
| 5 | Swap word positions | Text classification, NER | Swap positions of stop words. | Only swap stop words. Sentence meaning could still change in some cases. |
| 6 | Replace with synonym | Text classification, NER | Get synonyms from WordNet. | A simple replacement won’t be context-sensitive but it may be good enough. |
| | Replace with different word forms | Text classification, NER | Possible ways to generate different word forms: Lemmatize | |
| 8 | Add irrelevant data eg. Greeting Farewell Garbage utterance | Text classification, NER | We can get the following from our UM sets: Greeting Farewell | Ensure that data added should not cause a change in the label. |
| 9 | Replace words/phrases with slang | Text classification, NER | Replace words/phrases with slang. | Use slang dictionary. |
| 10 | Replace part of sentence with translated version (code switching) | Text classification, NER | Translate substrings of the sentence using translation script. | Silver translations should be good enough to preserve sentence meaning. |

At step 615, the machine-learning model is attacked using the pair of modified examples. The attacking comprises: (i) inputting the pair of modified examples into the machine-learning model while maintaining the same expected label unknown to the machine-learning model, and (ii) generating, by the machine-learning model, a pair of predictions for the pair of modified examples.

At step 620, the pair of predictions are compared to determine whether the pair of predictions are the same or different. As used herein, the “same” means that the two predictions must be exactly the same. For instance, in the case of NER, let’s say two modified examples are obtained: (1) Edison buys a new book and (2) Edison buys a new book. If for modified example (1), the model recognizes “Edison” as a Name Entity, but for modified example (2) the model doesn’t recognize “Edison” as a Name Entity, then they are different. Accordingly, the pair of predictions are the same if and only if the model recognizes “Edison” as Name Entity for both of the two modified examples in this example.

At step 625, in response to the pair of predictions being different, the pair of modified examples are added to a set of adversarial examples. Optionally, a user may review the pair of modified examples prior to addition to the set of adversarial examples, determine individually whether each modified example of the pair of modified examples is a true adversarial example, and limit the addition of the modified examples to the set of adversarial examples as only being the addition of the modified examples deemed by the user to be true adversarial examples to the set of adversarial examples. In some instances, in response to the pair of predictions being the same, the pair of modified examples are discarded since neither of the examples are considered to be adversarial.

At optional step 630, the machine-learning model (or a different machine-learning model) is trained using the set of adversarial example pairs. The training comprises annotating each example in the set of adversarial examples with an expected label to obtain annotated adversarial examples, feeding the annotated adversarial examples to the machine-learning model or the different machine-learning model, and learning a plurality of model parameters using the annotated adversarial examples based on maximizing or minimizing an objective function.

Illustrative Systems

Figure 7:
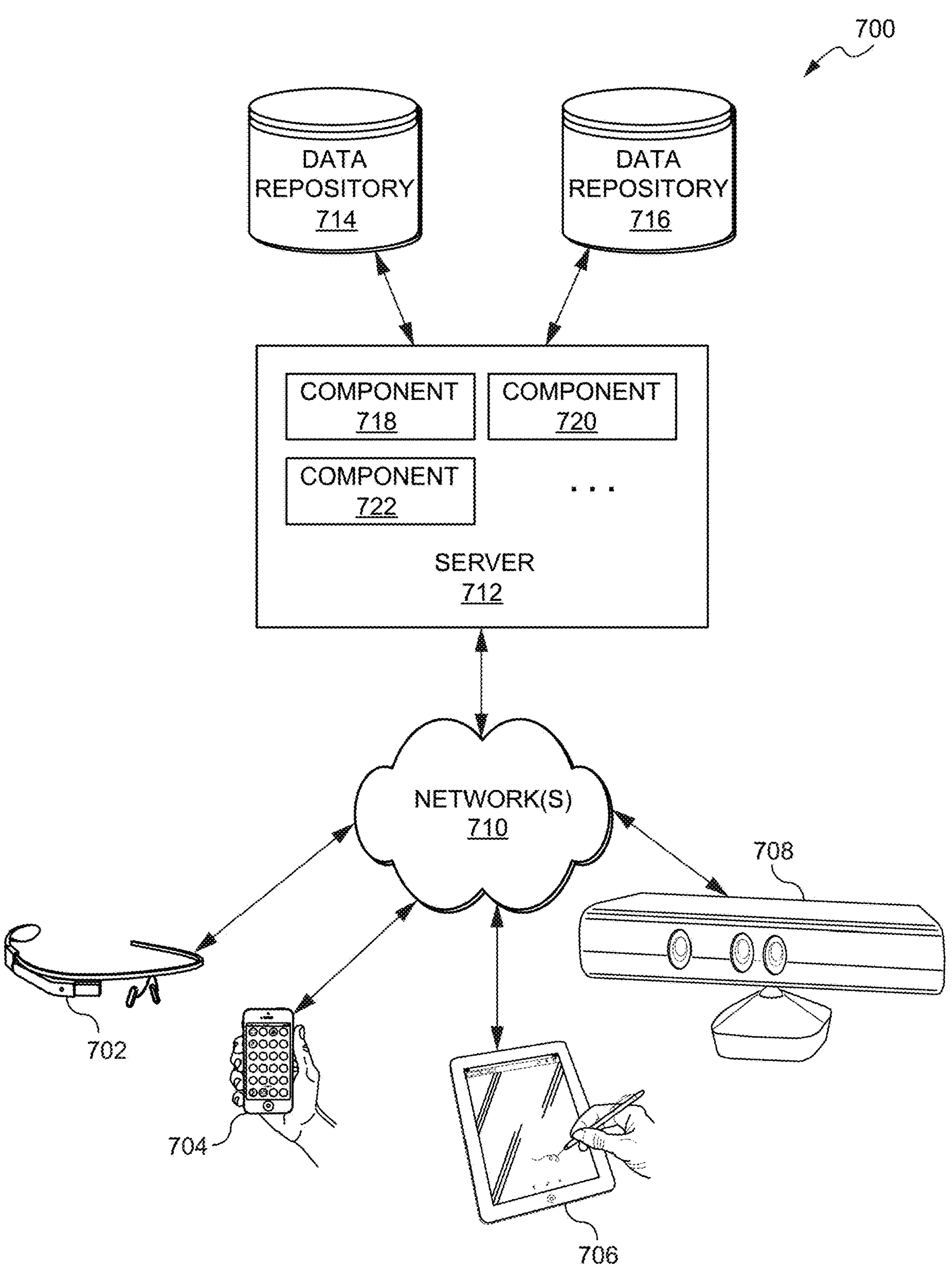
FIG. 7 depicts a simplified diagram of a distributed system for implementing various embodiments.

FIG. 7 depicts a simplified diagram of a distributed system 700. In the illustrated example, distributed system 700 includes one or more client computing devices 702, 704, 706, and 708, coupled to a server 712 via one or more communication networks 710. Clients computing devices 702, 704, 706, and 708 may be configured to execute one or more applications.

In various examples, server 712 may be adapted to run one or more services or software applications that enable one or more embodiments described in this disclosure. In certain examples, server 712 may also provide other services or software applications that may include non-virtual and virtual environments. In some examples, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The example shown in FIG. 7 is thus one example of a distributed system for implementing an example system and is not intended to be limiting.

Users may use client computing devices 702, 704, 706, and/or 708 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 710 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 may include one or more virtual machines running virtual operating systems, or other computing architectures involving virtualization such as one or more flexible pools of logical storage devices that may be virtualized to maintain virtual storage devices for the server. In various examples, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain examples. For example, one or more of the data repositories 714, 716 may be used to store information such as information related to chatbot performance or generated models for use by chatbots used by server 712 when performing various functions in accordance with various embodiments. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain examples, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain examples, one or more of data repositories 714, 716 may also be used by applications to store application data. The data repositories used by applications may be of different types such as, for example, a key-value store repository, an object store repository, or a general storage repository supported by a file system.

Figure 8:
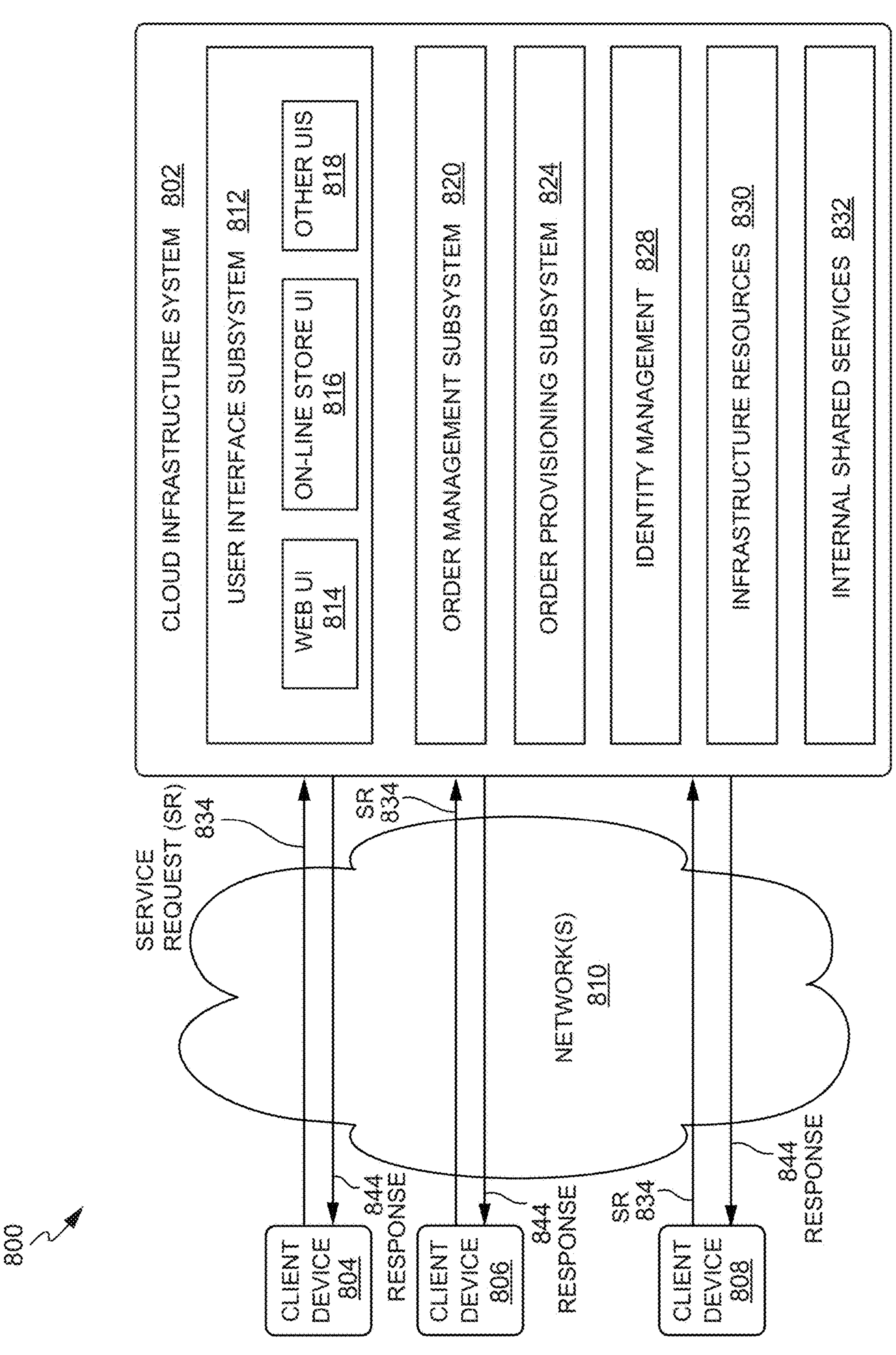
FIG. 8 is a simplified block diagram of one or more components of a system environment by which services provided by one or more components of an embodiment system may be offered as cloud services, in accordance with various embodiments.

In certain examples, the functionalities described in this disclosure may be offered as services via a cloud environment. FIG. 8 is a simplified block diagram of a cloud-based system environment in which various services may be offered as cloud services in accordance with certain examples. In the example depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in some other examples, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative examples.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer may be an individual or an enterprise. In certain other examples, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 802 and the services provided may be shared by several organizations in a related community. Various other models such as hybrids of the above mentioned models may also be used.

Client computing devices 804, 806, and 808 may be of different types (such as client computing devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request information or action from a chatbot as described in this disclosure.

In some examples, the processing performed by cloud infrastructure system 802 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 802 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like. In certain examples, the storage virtual machines that are available for servicing storage requested from applications may be part of cloud infrastructure system 802. In other examples, the storage virtual machines may be part of different systems.

In certain examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a service offered by cloud infrastructure system 802. As part of the order, the customer may provide information identifying a chatbot system for which the service is to be provided and optionally one or more credentials for the chatbot system.

In certain examples, such as the example depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 802 as part of the provisioning process. Cloud infrastructure system 802 may generate an application ID and select a storage virtual machine for an application from among storage virtual machines provided by cloud infrastructure system 802 itself or from storage virtual machines provided by other systems other than cloud infrastructure system 802.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 802 and information identifying a chatbot system selected by cloud infrastructure system 802 for the chatbot system corresponding to the chatbot system ID.

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain examples, cloud infrastructure system 802 comprises an identity management subsystem (IMS) 828 that is configured to manage customer information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
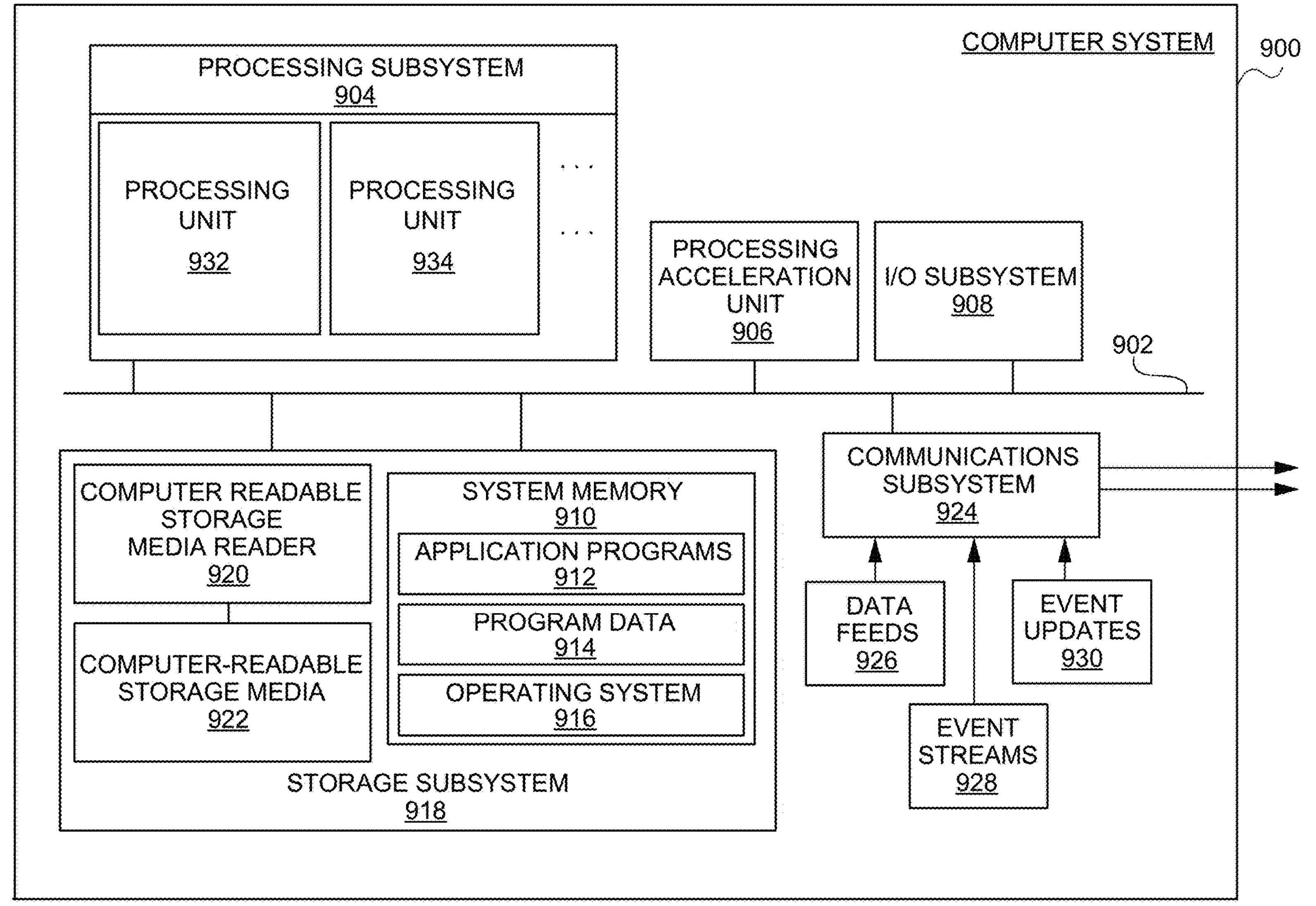
FIG. 9 illustrates an example computer system that may be used to implement various embodiments.

FIG. 9 illustrates an example of computer system 900. In some examples, computer system 900 may be used to implement any of the digital assistant or chatbot systems within a distributed environment, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative examples of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 may be organized into one or more processing units 932, 934, etc. A processing unit may include one or more processors, one or more cores from the same or different processors, a combination of cores and processors, or other combinations of cores and processors. In some examples, processing subsystem 904 may include one or more special purpose co-processors such as graphics processors, digital signal processors (DSPs), or the like. In some examples, some or all of the processing units of processing subsystem 904 may be implemented using customized circuits, such as application specific integrated circuits (ASICs), or field programmable gate arrays (FPGAs).

In some examples, the processing units in processing subsystem 904 may execute instructions stored in system memory 910 or on computer readable storage media 922. In various examples, the processing units may execute a variety of programs or code instructions and may maintain multiple concurrently executing programs or processes. At any given time, some or all of the program code to be executed may be resident in system memory 910 and/or on computer-readable storage media 922 including potentially on one or more storage devices. Through suitable programming, processing subsystem 904 may provide various functionalities described above. In instances where computer system 900 is executing one or more virtual machines, one or more processing units may be allocated to each virtual machine.

In certain examples, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some examples. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide authentication in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some examples. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 918 may also include a computer-readable storage media reader 920 that may further be connected to computer-readable storage media 922. Reader 920 may receive and be configured to read data from a memory device such as a disk, a flash drive, etc.

In certain examples, computer system 900 may support virtualization technologies, including but not limited to virtualization of processing and memory resources. For example, computer system 900 may provide support for executing one or more virtual machines. In certain examples, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, when computer system 900 is used to implement bot system 120 depicted in FIG. 1, the communication subsystem may be used to communicate with a chatbot system selected for an application.

Communication subsystem 924 may support both wired and/or wireless communication protocols. In certain examples, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802. XX family standards, or other mobile communication technologies, or any combination thereof), global positioning system (GPS) receiver components, and/or other components. In some examples, communications subsystem 924 may provide wired network connectivity (e.g., Ethernet) in addition to or instead of a wireless interface.

Communication subsystem 924 may receive and transmit data in various forms. In some examples, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMS, EPROMS, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer implemented method comprising:

receiving, at a digital assistant comprising a chatbot, one or more utterances from a user, wherein the one or more utterances comprise at least one utterance having noise;

inputting the one or more utterances into the chatbot;

processing, by the chatbot, the one or more utterances, wherein the processing comprises:

performing, by a machine learning model, one or more natural language tasks on the one or more utterances to obtain output, wherein the machine learning model is fine-tuned on adversarial examples in order to perform the one or more natural language tasks on utterances that have noise, wherein:

the adversarial examples comprise pairs of modified examples, one of the examples in each pair of modified examples has been modified from the other of the examples in each respective pair of modified examples in a utility preserving manner, the utility preserving manner includes modifying the example without changing an original meaning or expected label of the example, and the pair of modified examples share a same expected label, and generating, based on the output, a natural language response to the one or more utterances; and communicating, by the digital assistant, the response to the user.

2. The computer implemented method of claim 1, wherein the noise comprises one or more spelling mistake, a randomly inserted word, a randomly deleted word, swapped word positions, word synonyms, different word forms, irrelevant words, slang, translations, or any combination thereof.

3. The computer implemented method of claim 1, wherein the one of the examples in each pair of modified examples are modified by selecting one or more letters or words from the other of the examples in each respective pair of modified examples, and performing an insert, delete, or replace operation on the one or more letters or words.

4. The computer implemented method of claim 1, wherein the pairs of modified examples are generated by attacking the machine-learning model with initial pairs of modified examples, wherein the attacking comprises:

inputting the initial pairs of modified examples into the machine-learning model, generating, by the machine-learning model, a pair of predictions for each of the initial pairs of modified examples, comparing the pair of predictions for each of the initial pairs of modified examples to determine whether the pair of predictions are the same or different for each of the initial pairs of modified examples; and when a pair of predictions are different for a given initial pair of modified examples, adding the given initial pair of modified examples to the adversarial examples, which are used for fine-tuning the machine-learning model.

5. The computer implemented method of claim 4, wherein the fine-tuning comprises feeding the adversarial examples to the machine-learning model and learning or updating plurality model parameters to account for characteristics of the adversarial examples based on maximizing or minimizing an objective function.

6. The computer implemented method of claim 4, wherein the attacking further comprises when the pair of predictions are different and prior to adding the given initial pair of modified examples to the adversarial examples, determining individually whether the modified example of the given initial pair of modified examples is a true adversarial example, and limiting the addition of the modified example to the adversarial examples as only being the addition of the modified example deemed to be a true adversarial example to the adversarial examples.

7. A system comprising:

one or more processors; and a memory coupled to the one or more processors, the memory storing a plurality of instructions executable by the one or more processors, the plurality of instructions comprising instructions that when executed by the one or more processors cause the one or more processors to perform processing comprising:

receiving, at a digital assistant comprising a chatbot, one or more utterances from a user, wherein the one or more utterances comprise at least one utterance having noise;

inputting the one or more utterances into the chatbot;

processing, by the chatbot, the one or more utterances, wherein the processing comprises:

performing, by a machine learning model, one or more natural language tasks on the one or more utterances to obtain output, wherein the machine learning model is fine-tuned on adversarial examples in order to perform the one or more natural language tasks on utterances that have noise, wherein:

the adversarial examples comprise pairs of modified examples, one of the examples in each pair of modified examples has been modified from the other of the examples in each respective pair of modified examples in a utility preserving manner, the utility preserving manner includes modifying the example without changing an original meaning or expected label of the example, and the pair of modified examples share a same expected label, and generating, based on the output, a natural language response to the one or more utterances; and communicating, by the digital assistant, the response to the user.

8. The system of claim 7, wherein the noise comprises one or more spelling mistake, a randomly inserted word, a randomly deleted word, swapped word positions, word synonyms, different word forms, irrelevant words, slang, translations, or any combination thereof.

9. The system of claim 7, wherein the one of the examples in each pair of modified examples are modified by selecting one or more letters or words from the other of the examples in each respective pair of modified examples, and performing an insert, delete, or replace operation on the one or more letters or words.

10. The system of claim 8, wherein the pairs of modified examples are generated by attacking the machine-learning model with initial pairs of modified examples, wherein the attacking comprises:

inputting the initial pairs of modified examples into the machine-learning model, generating, by the machine-learning model, a pair of predictions for each of the initial pairs of modified examples, comparing the pair of predictions for each of the initial pairs of modified examples to determine whether the pair of predictions are the same or different for each of the initial pairs of modified examples; and when a pair of predictions are different for a given initial pair of modified examples, adding the given initial pair of modified examples to the adversarial examples, which are used for fine-tuning the machine-learning model.

11. The system of claim 10, wherein the fine-tuning comprises feeding the adversarial examples to the machine-learning model and learning or updating plurality model parameters to account for characteristics of the adversarial examples based on maximizing or minimizing an objective function.

12. The system of claim 10, wherein the attacking further comprises when the pair of predictions are different and prior to adding the given initial pair of modified examples to the adversarial examples, determining individually whether the modified example of the given initial pair of modified examples is a true adversarial example, and limiting the addition of the modified example to the adversarial examples as only being the addition of the modified example deemed to be a true adversarial example to the adversarial examples.

13. A non-transitory computer-readable memory storing a plurality of instructions executable by one or more processors, the plurality of instructions comprising instructions that when executed by the one or more processors cause the one or more processors to perform processing comprising:

receiving, at a digital assistant comprising a chatbot, one or more utterances from a user, wherein the one or more utterances comprise at least one utterance having noise;

inputting the one or more utterances into the chatbot;

processing, by the chatbot, the one or more utterances, wherein the processing comprises:

performing, by a machine learning model, one or more natural language tasks on the one or more utterances to obtain output, wherein the machine learning model is fine-tuned on adversarial examples in order to perform the one or more natural language tasks on utterances that have noise, wherein:

the adversarial examples comprise pairs of modified examples, one of the examples in each pair of modified examples has been modified from the other of the examples in each respective pair of modified examples in a utility preserving manner, the utility preserving manner includes modifying the example without changing an original meaning or expected label of the example, and the pair of modified examples share a same expected label, and generating, based on the output, a natural language response to the one or more utterances; and communicating, by the digital assistant, the response to the user.

14. The non-transitory computer-readable memory of claim 13, wherein the noise comprises one or more spelling mistake, a randomly inserted word, a randomly deleted word, swapped word positions, word synonyms, different word forms, irrelevant words, slang, translations, or any combination thereof.

15. The non-transitory computer-readable memory of claim 13, wherein:

the one of the examples in each pair of modified examples are modified by selecting one or more letters or words from the other of the examples in each respective pair of modified examples, and performing an insert, delete, or replace operation on the one or more letters or words.

16. The non-transitory computer-readable memory of claim 13, wherein the pairs of modified examples are generated by attacking the machine-learning model with initial pairs of modified examples, wherein the attacking comprises:

inputting the initial pairs of modified examples into the machine-learning model, generating, by the machine-learning model, a pair of predictions for each of the initial pairs of modified examples, comparing the pair of predictions for each of the initial pairs of modified examples to determine whether the pair of predictions are the same or different for each of the initial pairs of modified examples; and when a pair of predictions are different for a given initial pair of modified examples, adding the given initial pair of modified examples to the adversarial examples, which are used for fine-tuning the machine-learning model.

17. The non-transitory computer-readable memory of claim 16, wherein the fine-tuning comprises feeding the adversarial examples to the machine-learning model and learning or updating plurality model parameters to account for characteristics of the adversarial examples based on maximizing or minimizing an objective function.

18. The non-transitory computer-readable memory of claim 16, wherein the attacking further comprises when the pair of predictions are different and prior to adding the given initial pair of modified examples to the adversarial examples, determining individually whether the modified example of the given initial pair of modified examples is a true adversarial example, and limiting the addition of the modified example to the adversarial examples as only being the addition of the modified example deemed to be a true adversarial example to the adversarial examples.

* * * * *